US012492672B1

(12) United States Patent
Hinrichsen et al.

(10) Patent No.: US 12,492,672 B1
(45) Date of Patent: Dec. 9, 2025

(54) IDENTIFYING AND COUNTING COMMON RAIL FUEL SYSTEM PRESSURE RELIEF VALVE OPENING EVENTS

(71) Applicant: Caterpillar Inc., Peoria, IL (US)

(72) Inventors: Ryan M. Hinrichsen, Groveland, IL (US); Daniel R. Puckett, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/929,987

(22) Filed: Oct. 29, 2024

(51) Int. Cl.
*F02M 69/46* (2006.01)
*F02M 55/02* (2006.01)
*F02M 65/00* (2006.01)

(52) U.S. Cl.
CPC .......... *F02M 65/00* (2013.01); *F02M 55/025* (2013.01)

(58) Field of Classification Search
CPC ............. F02D 2200/0602; F02D 41/22; F02D 41/3863; F02M 55/025; F02M 63/005
USPC .......................................................... 123/456
See application file for complete search history.

(56) References Cited

U.S. PATENT DOCUMENTS 7,574,297 B2 8/2009 Pauer
7,706,962 B2 4/2010 Fushiki et al.
8,511,275 B2 8/2013 Nistler et al.
10,865,729 B2 12/2020 Achleitner et al.
11,078,876 B2 * 8/2021 Sakamoto ........... F16K 37/0066
11,415,071 B2 * 8/2022 Agnus .................. F02M 63/023
2015/0167607 A1 6/2015 Park
2022/0268233 A1 * 8/2022 Kennedy .............. G07C 5/0808

FOREIGN PATENT DOCUMENTS

DE 102005043684 A1 3/2007
DE 10343758 B4 2/2015
EP 0886058 B1 11/2004
JP 3900903 B2 4/2007

* cited by examiner

*Primary Examiner* — Logan M Kraft
*Assistant Examiner* — James J Kim
(74) *Attorney, Agent, or Firm* — Bookoff McAndrews, PLLC

(57) ABSTRACT

In one instance, disclosed herein is a common rail fuel system for an engine system including an engine, the common rail fuel system comprising a controller configured to: detect a start of the engine; increment a PRV opening events counter; determine if a low speed condition of the engine was met before the controller turns off based on sensor data received from a rail pressure sensor or sensor data received from an engine speed sensor; in response to determining that the low speed engine condition was met before the controller turned off, decrement the PRV opening events counter; determine if the PRV opening events counter has exceeded a PRV opening events threshold; and in response to determining that the PRV opening events counter has exceeded the PRV opening events threshold, output a signal indicating that the PRV should be repaired or replaced.

20 Claims, 7 Drawing Sheets

IDENTIFYING AND COUNTING COMMON RAIL FUEL SYSTEM PRESSURE RELIEF VALVE OPENING EVENTS

TECHNICAL FIELD

The present disclosure relates generally to common rail fuel systems, and more particularly, to systems and methods for counting opening events of a pressure relief valve of a common rail fuel system.

BACKGROUND

Common rail fuel systems, e.g., for internal combustion engines, often include a high pressure fuel pump that provides fuel to a fuel rail at specified and/or controlled pressures. Some common rail fuel systems also include a pressure relief valve (PRV) for relieving pressure within the fuel rail, e.g., when the pressure within the fuel rail reaches a level that is undesirably high, such that failure of the common rail fuel system may be avoided. Such a PRV may have a high-pressure trigger point that causes the PRV to open, and a low-pressure reset point that causes the PRV to close. The high-pressure trigger point corresponds to a pressure that is well above any normal operating pressure of the common rail fuel system, such that normal operation of the common rail fuel system generally does not cause the PRV to open. However, various circumstances outside of the normal operation of the common rail fuel system may cause the pressure within the fuel rail to exceed the high-pressure trigger point of the PRV and cause the PRV to open. In some instances, it is recommended that a PRV of a common rail fuel system be repaired or replaced after opening a threshold number of times. It may therefore be desirable to count the number of times that a PRV of a common rail fuel system opens.

There are circumstances in which a PRV of a common rail fuel system opens, or may open, that are difficult to detect. For example, it is difficult to detect instances in which the PRV opens due to a controller of the common rail fuel system turning off before an engine speed of an associated engine has decreased to zero, or due to the controller resetting while the engine is in operation. If these or similar instances of the PRV opening are not properly accounted for, the PRV may not be repaired or replaced before the PRV fails during operation, and the common rail fuel system may incur damage that may have otherwise been avoidable.

DE Patent Publication No. 102005043684A1 to Wolber et al. ("the '684 publication") describes methods for controlling a fuel pump according to a predetermined controls during an overrun fuel cut-off of an internal combustion engine. The predetermined controls are adapted in response to an initial start or a reset of a control unit, and are stored in a non-volatile memory of the control unit. However, the '684 publication does not describe, among other things, counting openings of a PRV.

The systems and methods of the present disclosure may solve one or more of the problems set forth above and/or other problems in the art. The scope of the protection provided by the present disclosure, however, is defined by the attached claims, and not by the ability to solve any specific problem.

SUMMARY

In one aspect, a common rail fuel system for an engine system including an engine includes: a fuel rail; a fuel pump fluidly coupled to the fuel rail; a pressure relief valve (PRV) fluidly coupled to the fuel rail; a rail pressure sensor; an engine speed sensor; and a controller, communicatively coupled to the rail pressure sensor and to the engine speed sensor, configured to: detect a start of the engine; in response to detecting the start of the engine, increment a PRV opening events counter; determine if a low speed condition of the engine was met before the controller turns off; in response to determining that the low speed engine condition was met before the controller turned off, decrement the PRV opening events counter; determine if the PRV opening events counter has exceeded a PRV opening events threshold; and in response to determining that the PRV opening events counter has exceeded the PRV opening events threshold, output a signal indicating that the PRV should be repaired or replaced.

In another aspect, a controller for a common rail fuel system operatively coupled to an engine system including an engine, the common rail fuel system including a fuel pump, a fuel rail, and a pressure relief valve (PRV), includes at least one processor and at least one memory storing instructions which, when executed by the at least one processor, cause the at least one processor to perform operations comprising: determining if the controller reset; determining if the PRV opened; in response to determining that the PRV opened, incrementing a PRV opening events counter; determining if the PRV opening events counter has exceeded a PRV opening events threshold; and in response to determining that the PRV opening events counter has exceeded the PRV opening events threshold, outputting a signal indicating that the PRV should be repaired or replaced.

In another aspect, a common rail fuel system operatively coupled to an engine system including an engine includes: a fuel rail; a fuel pump fluidly coupled to the fuel rail; a pressure relief valve (PRV) fluidly coupled to the fuel rail; a rail pressure sensor; an engine speed sensor; and a controller, communicatively coupled to the rail pressure sensor and to the engine speed sensor, configured to: increment a PRV opening events counter based on sensor data received from the rail pressure sensor or sensor data received from the engine speed sensor; determine if the PRV opening events counter has exceeded a PRV opening events threshold; and in response to determining that the PRV opening events counter has exceeded the PRV opening events threshold, output a signal indicating that the PRV should be repaired or replaced.

BRIEF DESCRIPTION OF THE DRAWINGS

The accompanying drawings, which are incorporated in and constitute a part of this specification, illustrate various exemplary embodiments and, together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
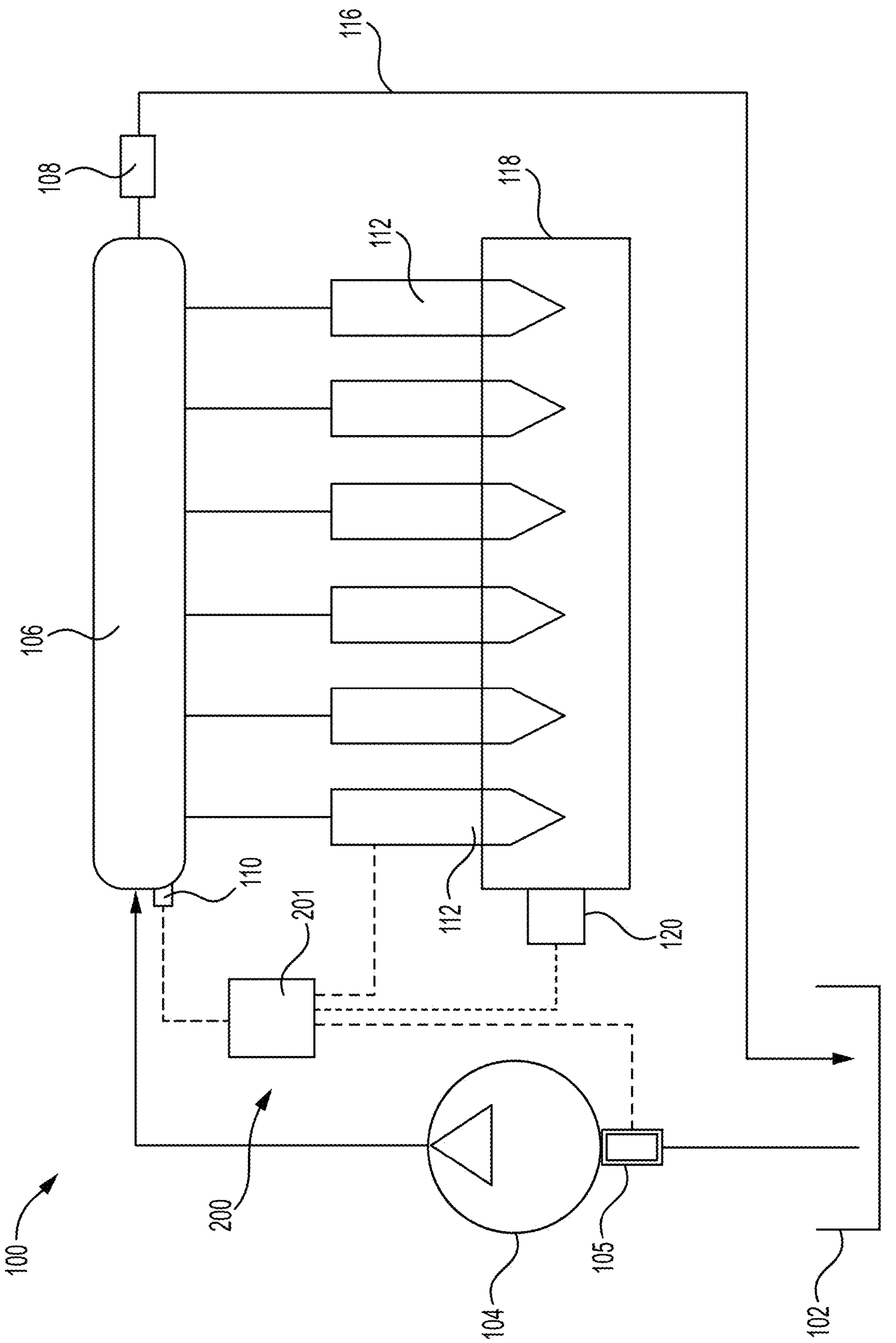
FIG. 1 depicts a schematic diagram of an exemplary common rail fuel system of an engine system.

FIG. 1 depicts a schematic diagram of an exemplary common rail fuel system 100. The common rail fuel system 100 may be included in or operatively coupled to an engine system, which may include an engine 118, e.g., an internal combustion engine (ICE), and a plurality of fuel injectors 112. The common rail fuel system 100 may include a fuel tank 102, a fuel pump 104, a fuel rail 106, and a pressure relief valve (PRV) 108. The common rail fuel system 100 may further include a control system 200 including a controller 201 operatively coupled to one or more components of the common rail fuel system 100 and/or the engine system. The components of the common rail fuel system 100 may be fluidly or otherwise operatively coupled to one another, and fluidly or otherwise operatively coupled to one or more components of the engine system, such that the common rail fuel system 100 may provide fuel to the engine system, which the engine system may use, e.g., combust, the fuel to drive a crankshaft and provide torque to one or more external systems (not shown).

Fuel pump 104 may be any type of fuel pump, such as an inlet-metering fuel pump having an inlet metering valve (IMV) 105, for providing fuel at a specified and/or controlled pressure to the fuel rail 106. Fuel rail 106 may be a plenum in the form of a pipe that is fluidly coupled to each of the fuel injectors 112 of the engine system for providing pressurized fuel to the fuel injectors 112. The fuel injectors 112 may in turn inject the fuel received from the fuel rail 106 into the engine 118. It will be understood and appreciated that, although the fuel pump 104 is often described herein as including or being operatively coupled to an inlet metering valve 105, the fuel pump 104 may include or be operatively coupled to any appropriate type of metering valve for accomplishing any of the functions disclosed herein, e.g., an inlet metering valve or an outlet metering valve.

PRV 108 may be a pressure-responsive relief valve fluidly coupled to the fuel rail 106 and may include a mechanical triggering system, such as a spring-loaded valve and latching element that function cooperatively to open and to keep open (or "latch") the PRV 108 in response to a rail pressure of the fuel rail 106 reaching or exceeding a high-pressure trigger point of the PRV 108. When the PRV 108 is opened, the fuel rail 106 is fluidly coupled to a low pressure passageway 116 that is fluidly coupled to the fuel tank 102, such that fuel and/or pressure within the fuel rail 106 may be relieved to the fuel tank 102. Once opened, the PRV 108 may be configured to remain open until the rail pressure of the fuel rail 106 decreases to a low-pressure reset point of the PRV 108, at which point the PRV 108 is mechanically and/or automatically configured to close. For example, in one embodiment, the high-pressure trigger point of the PRV 108 is approximately 300 MPa, and the low-pressure reset point of the PRV 108 is approximately 60 MPa.

As depicted in FIG. 1, the common rail fuel system 100 may further include or be communicatively coupled to one or more sensors operatively coupled to the control system 200 and configured to generate sensor data pertaining to various components of the common rail fuel system 100 or the engine system. For example, as depicted in FIG. 1, control system 200 may be communicatively coupled to a rail pressure sensor 110 and an engine speed sensor 120. The rail pressure sensor 110 may be any appropriate type of sensor for sensing the rail pressure of the fuel rail 106 (e.g., the pressure of fuel within the fuel rail 106) and providing the sensed rail pressure as sensor data to the controller 201. The engine speed sensor 120 may be any appropriate type of sensor for sensing an output speed of the engine 118 and providing the sensed engine speed as sensor data to the controller 201. As will be described in further detail below, the controller 201 may be configured to send signals to, and receive signals from, various components of the common rail fuel system 100 and/or the engine system to control the rail pressure of the fuel rail 106 based on, e.g. desired power, regulation of engine emissions, etc.

Figure 2:
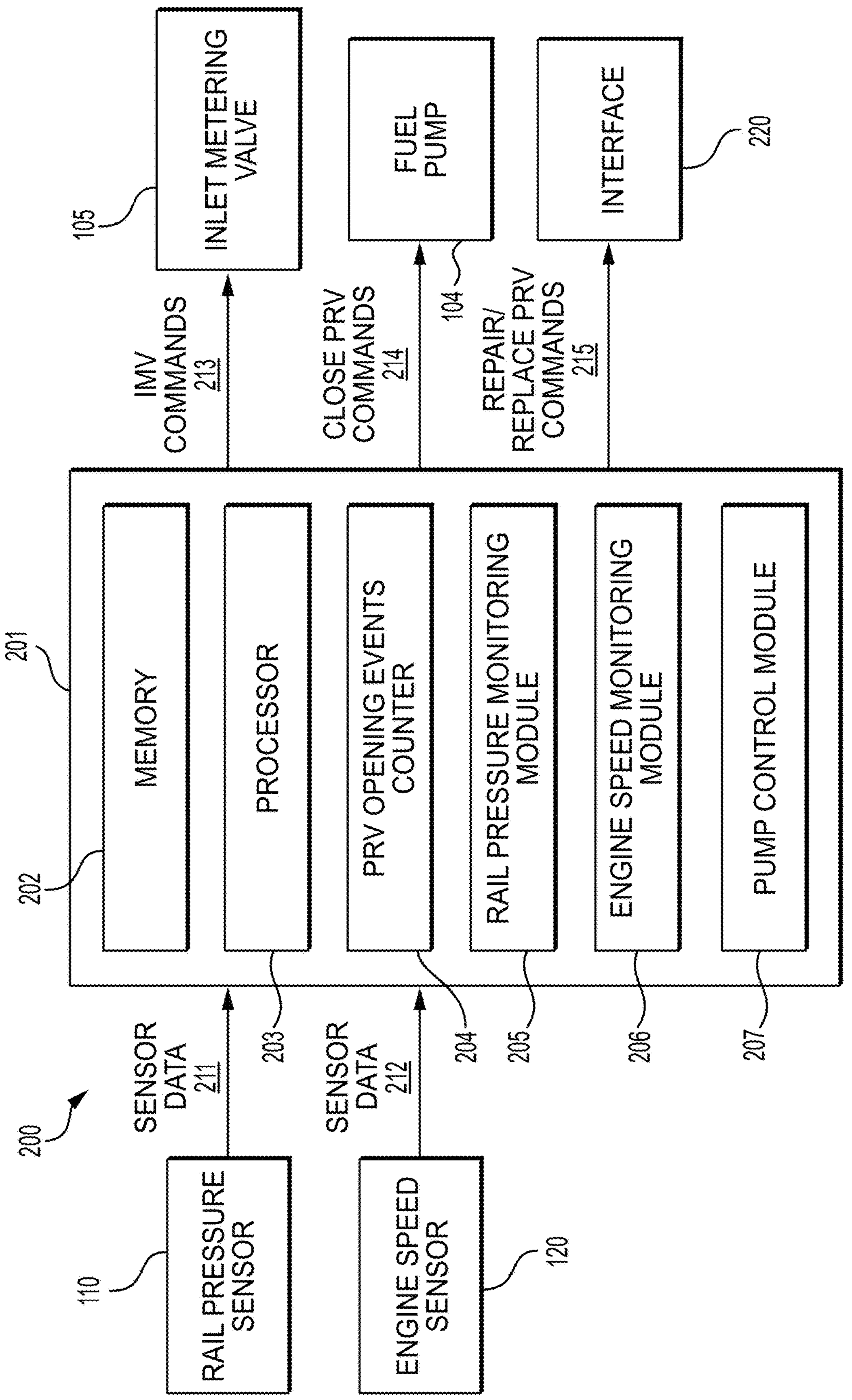
FIG. 2 depicts a block diagram of an exemplary control system of a common rail fuel system.

FIG. 2 depicts a block diagram of an exemplary control system 200 of a common rail fuel system 100. As depicted in FIG. 2, the control system 200 includes the controller 201, which may be communicatively coupled to or otherwise include one or more modules or systems for carrying out one or more functions of the engine system and common rail fuel system 100. As described in further detail below, control system 200 may receive inputs in the form of data, signals, etc., such as sensor data 211 received from the rail pressure sensor 110 and sensor data 212 received from the engine speed sensor 120. As described in further detail below, control system 200 may further generate outputs in the form of data, signals, etc., such as IMV commands 213 transmitted to the IMV 105, close PRV commands 214 transmitted to the fuel pump 104, and repair/replace PRV commands 215 transmitted to an interface 220, e.g., an on-board or off-board control interface of a machine that includes the common rail fuel system 100. The interface 220 may be a display or an electronic device including a display capable of providing an operator of a machine that includes the common rail fuel system 100 with information regarding the common rail fuel system 100. For example, the interface 220 may be a display for a supervisory computer system, a mobile computing device, or a dashboard.

As depicted in FIG. 2, the controller 201 may include at least one memory 202, at least one processor 203 communicatively coupled to the memory 202, or any other means for accomplishing a task consistent with the present disclosure. The at least one memory 202 may store instructions, e.g., data and/or software, operative to enable or cause the processor 203 to perform various functions and operations. In particular, the at least one memory 202 and/or the at least one processor 203 may allow the controller 201 to perform any of the PRV opening events counting functions described herein. Numerous commercially available microprocessors can be configured to perform the functions of the controller 201. Various other known circuits may be associated with the controller, including signal-conditioning circuitry, communication circuitry, and/or any other appropriate type of circuitry. As used herein, "controller" encompasses a single controller or multiple controllers operatively or communicatively coupled to one another and/or other components of the common rail fuel system 100 or the engine system.

The controller 201, e.g., the memory 202 and/or the processor 203, may include various modules operative to receive sensed inputs and generate commands and/or other signals to control the operation of the common rail fuel system 100 and/or the engine system. For example, the controller 201 may include a PRV opening events counter 204 operative to maintain a record of how many times the PRV 108 has opened, a rail pressure monitoring module 205 operative to monitor the rail pressure of the fuel rail 106, an engine speed monitoring module 206 operative to monitor the engine speed of the engine 118, and a pump control module 207 operative to control a level of flow from the fuel pump 104 to the fuel rail 106. The various modules of the controller 201 may function cooperatively to allow the common rail fuel system 100 to perform any of the PRV opening events counting functions described herein, as described in further detail below. For example, the various modules of the controller 201 may function cooperatively to detect, log, and/or store a sum total of any and all instances in which the PRV 108 opened for any reason. The PRV opening events counter 204 may be stored in the memory 202. In some instances, the controller 201 may detect and/or log a PRV opening event in response to a reset of the controller 201, as described in further detail below. In some instances, the controller 201 may detect and/or log a PRV opening event in response to an engine speed of an associated engine 118 decreasing to zero, or otherwise meeting a low speed condition, before the controller 201 turns off, as described in further detail below. Further, the controller 201 may detect and/or log a PRV opening event that occurs without a reset or removal of power to the controller 201, such as a high-pressure event that occurs due to wear or failure of the inlet metering valve 105. However, the controller 201 may detect and/or log a PRV opening event in any other way.

INDUSTRIAL APPLICABILITY

The systems, apparatuses, and methods disclosed herein may find application in any machine that includes a common rail fuel system. In particular, the systems, apparatuses, and methods disclosed herein may be advantageously used in any machine including a common rail fuel system for which it is desirable to accurately count the number of times that a PRV included in the common rail fuel system opens. As mentioned above, there may be various circumstances in which a PRV of a common rail fuel system opens, or may be open, that may be difficult to detect, such as instances in which the PRV opens in response to a controller of the common rail fuel system resetting, or instances in which the PRV opens due to a controller of the common rail fuel system turning off before an engine speed of an engine operatively coupled to the common rail fuel system meets a low speed condition, as described below.

Figure 3:
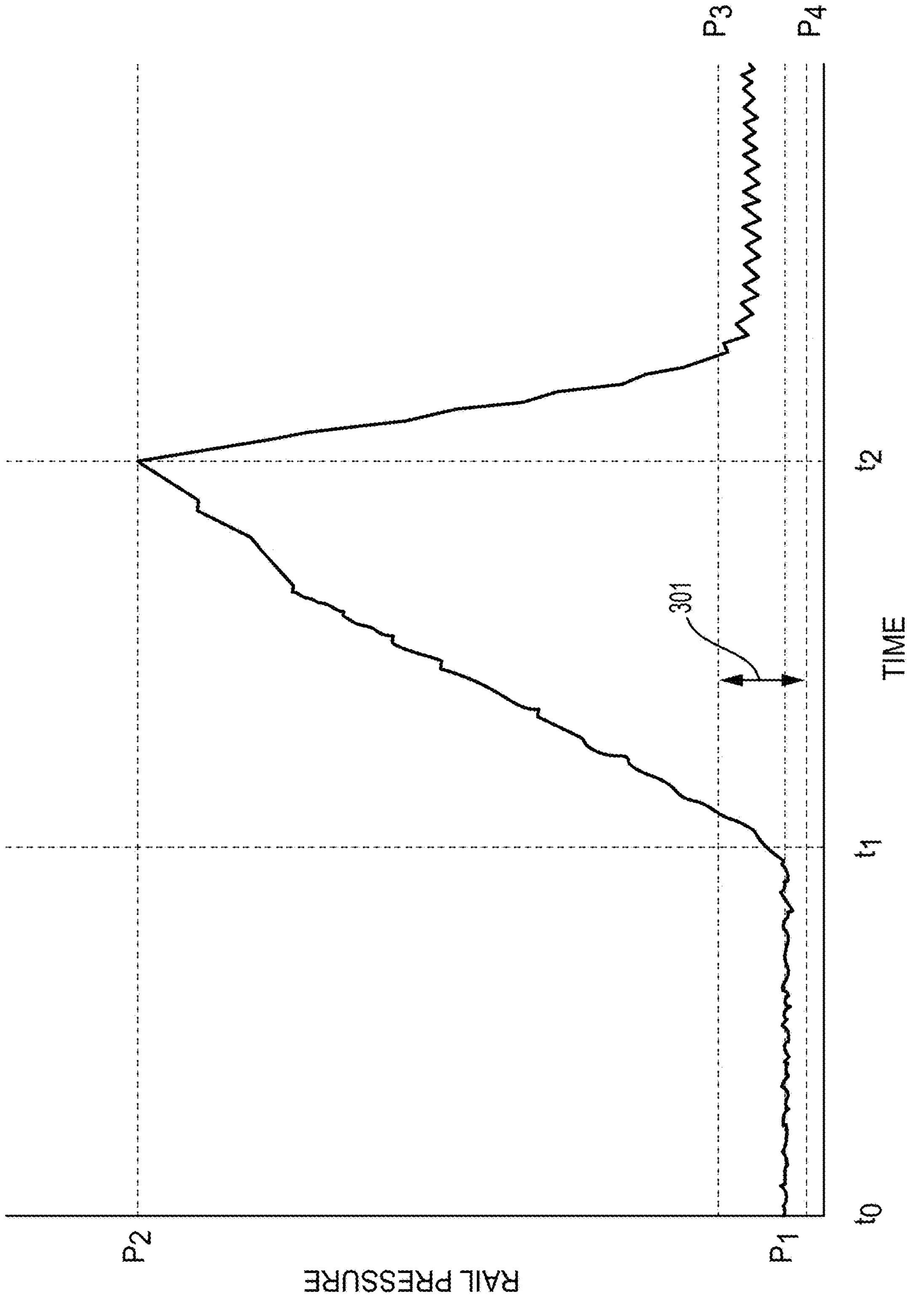
FIG. 3 depicts a chart representing an exemplary operation of a common rail fuel system.

FIG. 3 depicts a chart representing an exemplary operation of a common rail fuel system 100. In this example, a level of flow from the fuel pump 104 of the common rail fuel system 100 to the fuel rail 106 may be controlled by an IMV 105. The IMV 105 is a normally-open valve, and the controller 201 of the common rail fuel system 100 generates and outputs IMV commands 213 that cause the IMV 105 to continuously restrict flow from the fuel pump 104 to the fuel rail 106. From time to $t_0$ time $t_1$, the engine 118 operatively coupled to the common rail fuel system 100 runs at a substantially constant engine speed, and, accordingly, the controller 201 generates and outputs IMV commands 213 that cause the IMV 105 to limit flow from the fuel pump 104 to the fuel rail 106 such that the rail pressure of the fuel rail 106 is held substantially constant at a pressure $P_1$.

However, in this example, if the controller 201 resets while the engine 118 is running, e.g., at time $t_1$, the IMV 105 may stop receiving IMV commands 213 from the controller 201 and may consequently stop restricting flow from the fuel pump 104 to the fuel rail 106 (e.g., because IMV 105 is a normally-open valve). As a result, the rail pressure of the fuel rail 106 may increase rapidly, reaching the high-pressure trigger point of the PRV 108, pressure $P_2$. In response to the rail pressure of the fuel rail 106 reaching the high-pressure trigger point of the PRV 108, the PRV 108 opens, e.g., at time $t_2$, which causes the rail pressure of the fuel rail 106 to decrease rapidly.

The controller 201 turns back on at time $t_3$. Without recognizing that the PRV 108 has opened, e.g., because the PRV 108 opened while the controller 201 was turned off (e.g., lost power) during the reset of the controller 201, the common rail fuel system 100 may attempt to correct for a lower than desired rail pressure, such as by generating and outputting IMV commands 213 that cause the IMV 105 to increase flow from the fuel pump 104 to the fuel rail 106. However, because the PRV 108 remains open, the rail pressure of the fuel rail 106 is continuously relieved. This may result in the rail pressure exhibiting a characteristic chopping pattern in which the rail pressure remains below a first non-zero pressure level $P_3$ and above a second non-zero pressure level $P_4$, both of which are higher than the low-pressure reset point of the PRV 108. In other words, if the PRV 108 opens in response to the controller 201 resetting, the rail pressure of the fuel rail 106 may stabilize and/or be maintained within a pressure regulated range 301 defined by the first non-zero pressure level $P_3$ and the second non-zero pressure level $P_4$.

In such an instance, it may be desirable for the common rail fuel system 100, e.g., the controller 201, to determine that the PRV 108 opened in response to the reset of the controller 201, so that 1) the common rail fuel system 100 can cause an additional reduction in fuel pressure sufficient to close the PRV 108 and thereby restore normal operation of the common rail fuel system 100 and 2) the common rail fuel system 100 can properly identify and account for the PRV 108 opening, because it may be recommended that the PRV 108 be repaired or replaced after opening a threshold number of times, as mentioned above.

The controller 201 may detect (e.g., determine based on values stored in memory and/or sensed data) that the controller 201 experienced a reset in various ways. For example, in one strategy, the controller 201 may determine that the controller 201 reset by identifying the presence or existence of one or more boot variables used during the startup or booting of the controller 201. Or for example, in another strategy, whenever the controller 201 turns on, the controller 201 establishes a startup variable in the memory 202 that is deleted if/when the controller 201 turns off normally, e.g., without resetting. Thus, if the controller 201 turns on and the startup variable is already established, the controller 201 can determine that the controller 201 reset based on the existence of the startup variable. However, the controller 201 may detect the reset of the controller in any other appropriate way.

To determine if/when the PRV 108 opened in response to the reset of the controller 201, the controller 201 may monitor the rail pressure of the fuel rail 106 by continuously receiving rail pressure measurements from the rail pressure sensor 110 in the form of sensor data 211 and storing the rail pressure measurements, e.g., in the memory 202. Then, in response to detecting the reset of the controller 201, the controller 201 may analyze the rail pressure measurements stored in the memory 202, such as by employing the rail pressure monitoring module 205.

In some instances, to determine that the controller 201 reset, the controller 201 may monitor an engine speed of an engine 118 operatively coupled to the common rail fuel system 100 by continuously receiving engine speed measurements from the engine speed sensor 120 in the form of sensor data 212 and storing the engine speed measurements, e.g., in the memory 202. Then, in response to detecting the reset of the controller 201, the controller 201 may analyze the engine speed measurements stored in the memory 202, such as by employing the engine speed monitoring module 206. For example, in some instances, in response to identifying the presence or existence of one or more boot variables used during the startup or booting of the controller 201, the controller 201 may first employ the engine speed monitoring module 206 to determine if an engine speed of the engine 118 is substantially zero (or if the engine speed of the engine 118 meets a low speed condition, as described below), or if the engine speed of the engine 118 is substantially non-zero, e.g., substantially greater than zero, these determinations being made immediately upon identifying the presence or existence of one or more boot variables. If the engine speed of the engine 118 is substantially non-zero, the controller 201 may determine that the controller 201 reset, e.g., because during normal operation of the common rail fuel system 100, the controller 201 may only identify the presence or existence of the one or more boot variables during an initial start of an associated engine 118, at which point the engine speed of the engine 118 would be substantially zero. If the engine speed of the engine 118 is substantially zero, the controller 201 may determine that the controller 201 did not reset. For example, an engine speed of substantially zero may be less than about 50 RPM. Similarly, an engine speed that is substantially non-zero may be greater than about 50 RPM.

After determining that the controller 201 reset, the controller 201 may then determine if the PRV 108 opened. Determining if the PRV 108 opened may include one or more steps. For example, in response to detecting the reset of the controller 201, the controller 201 may employ the rail pressure monitoring module 205 to determine if the rail pressure of the fuel rail 106 is within the pressure regulated range 301, as described above. As described above, the rail pressure being within the pressure regulated range 301 may indicate that the PRV 108 opened, e.g., due to the controller 201 attempting to correct for a lower than desired pressure while the fuel rail 106 is being continuously relieved by the PRV 108. Whether or not the rail pressure of the fuel rail 106 is within the pressure regulated range 301 may be referred to as a first PRV opening event condition. In some instances, if the rail pressure of the fuel rail 106 is determined to be within the pressure regulated range 301 (e.g., if the first PRV opening event condition is met), the controller 201 may determine that the PRV 108 opened in response to the reset of the controller 201.

In some instances, after determining that the rail pressure is within the pressure regulated range 301, the controller 201 may confirm that the PRV 108 opened by generating and outputting an increase pressure command, e.g., an IMV command 213 that causes the IMV 105 to increase flow from the fuel pump 104 to the fuel rail 106, such as by employing the pump control module 207. The controller 201 may then employ the rail pressure monitoring module 205 to determine if, after outputting the increase pressure command, the rail pressure of the fuel rail 106 remained within the pressure regulated range 301. The rail pressure remaining within the pressure regulated range 301 after the controller 201 outputs the increase pressure command may indicate that the PRV 108 opened, e.g., because the rail pressure may fail to increase in response to the increase pressure command if the fuel rail 106 is being continuously relieved by the PRV 108. Whether or not the rail pressure of the fuel rail 106 remains within the pressure regulated range 301 after the controller 201 outputs the increase pressure command may be referred to as a second PRV opening event condition. In some instances, if the rail pressure of the fuel rail 106 is determined to have remained within the pressure regulated range 301 after the controller 201 outputs the increase pressure command (e.g., if the second PRV opening event condition is met), the controller 201 may conclude that the PRV 108 opened in response to the reset of the controller 201.

If the common rail fuel system 100 determines that the PRV 108 opened in response to the reset of the controller 201, e.g., if the controller 201 detects the reset of the controller 201 and determines that first and second PRV opening event conditions have been met, the controller 201 may 1) output a close PRV command, e.g., an IMV command 213 that causes the IMV 105 to limit flow from the fuel pump 104 to the fuel rail 106 such that the rail pressure of the fuel rail 106 decreases to a level below the low-pressure reset point of the PRV 108, such as by employing the pump control module 207, and/or 2) increment the PRV opening events counter 204. After incrementing the PRV opening events counter 204, the controller 201 may determine if the PRV opening events counter 204 has exceeded a PRV opening events threshold. If the controller 201 determines that the PRV opening events counter 204 has exceeded the PRV opening events threshold, the controller 201 may generate and output a repair/replace PRV command 215 to an interface 220, as described above. A repair/replace PRV command 215 may be a signal indicating that the PRV should be repaired or replaced. Outputting a repair/replace PRV command 215 to the interface 220 may cause the interface 220 to display a notification indicating that the PRV should be repaired or replaced to an operator of a machine that includes the common rail fuel system 100.

Figure 4A:
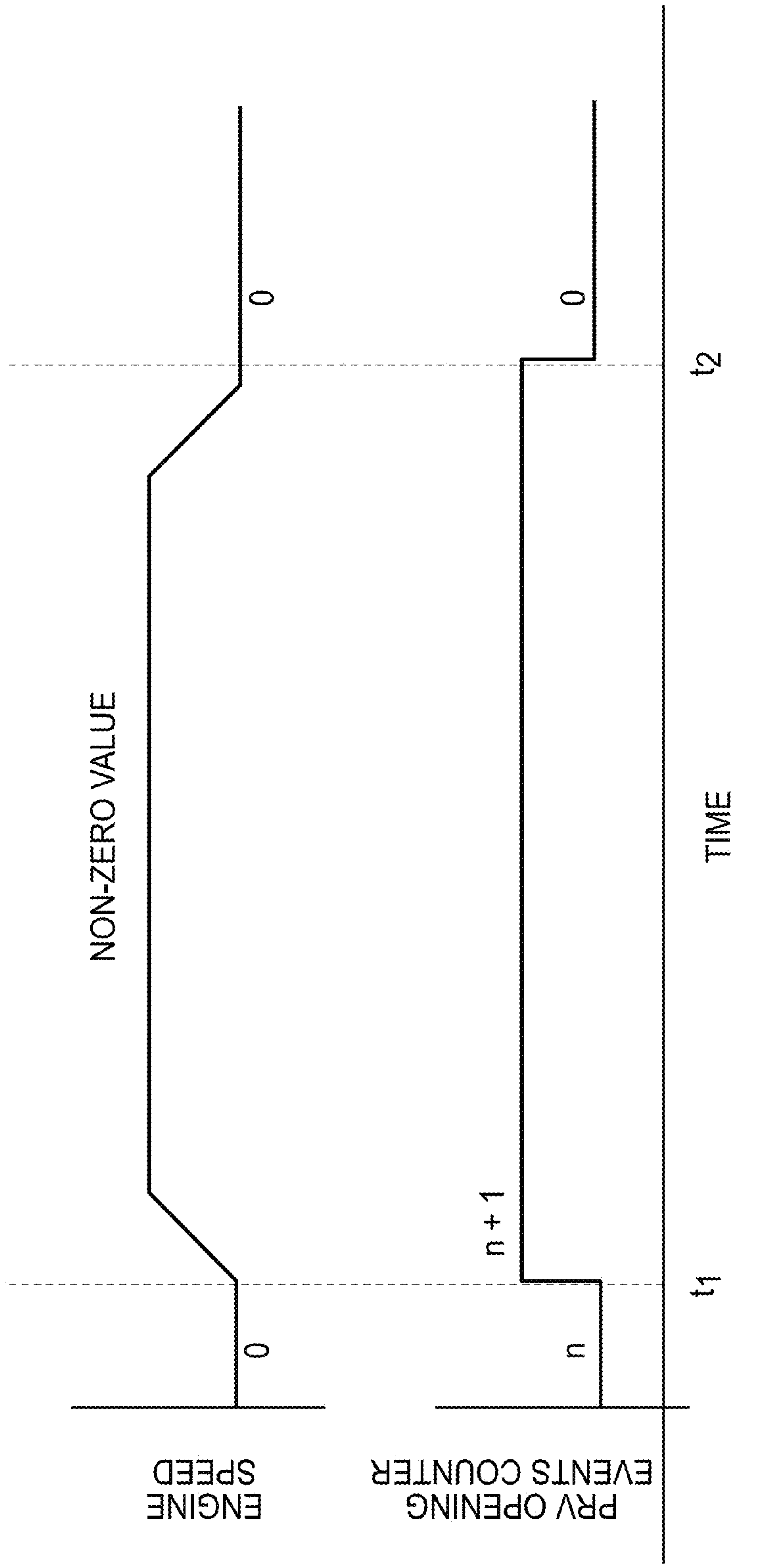
FIGS. 4A and 4B depict charts representing exemplary operations of a control system of a common rail fuel system.
Figure 4B:
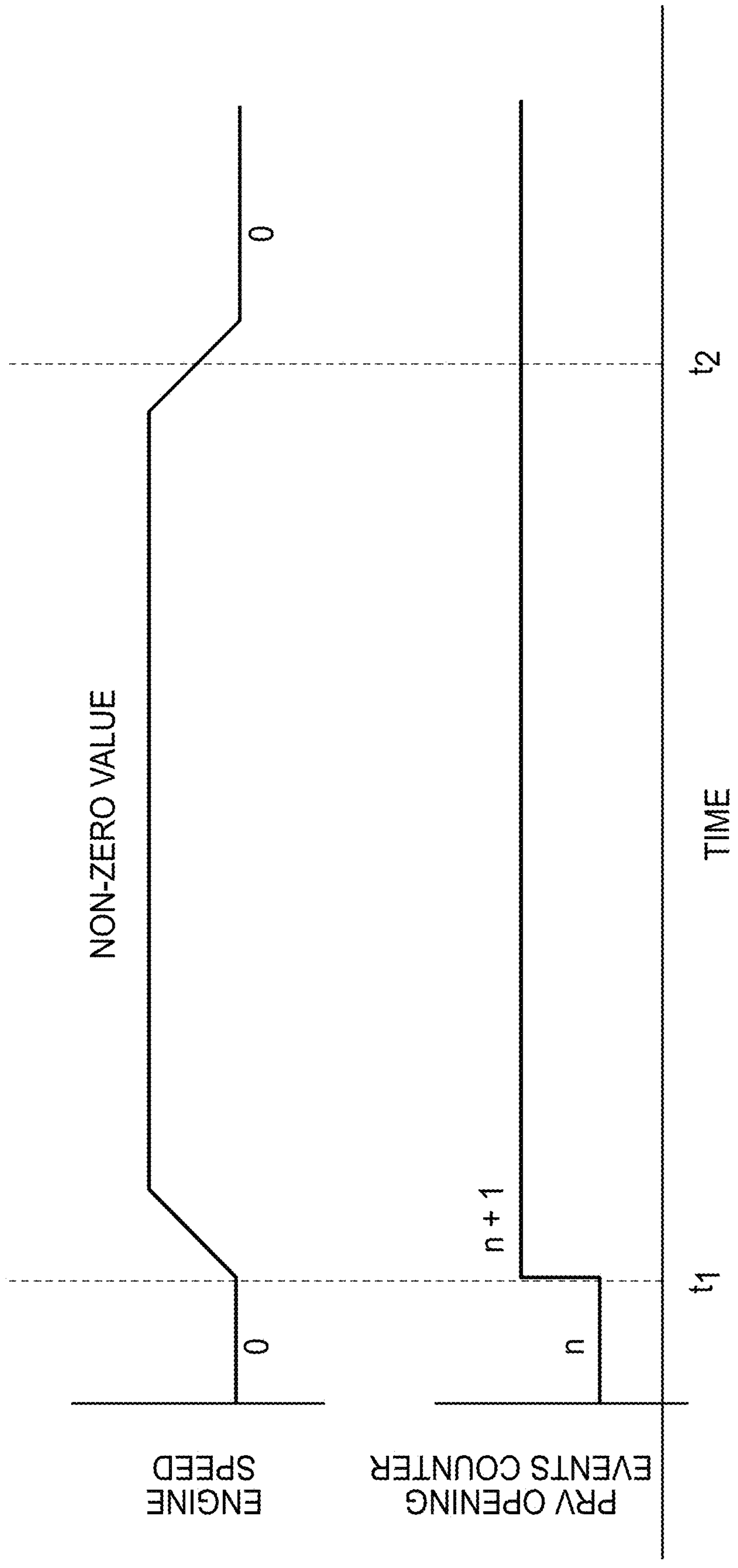

FIGS. 4A and 4B depict charts representing exemplary operations of a common rail fuel system 100. As mentioned above, if the engine speed of an engine 118 operatively coupled to the common rail fuel system 100 is substantially zero, it may be unlikely that a level of flow from the fuel pump 104 to the fuel rail 106 is high enough to cause the PRV 108 to open, even if the IMV 105 stops receiving IMV commands 213 from the controller 201. However, if the engine speed of the engine 118 is non-zero, e.g., substantially greater than zero, when the IMV 105 stops receiving IMV commands 213 from the controller 201, the level of flow from the fuel pump 104 to the fuel rail 106 may be high enough to cause the PRV 108 to open. There is therefore a risk that the PRV 108 opens and that the opening of the PRV 108 is undetected if the controller 201 is turned off before the engine speed of the engine 118 decreases from a non-zero value to zero.

To compensate for this risk and ensure that every opening of the PRV 108 is properly accounted for, the controller 201 may increment, e.g., preemptively, the PRV opening events counter 204 when the controller 201 detects a start of the engine 118. The controller 201 may detect a start of the engine 118 in various ways. For example, the controller 201 may detect a start of the engine 118 by detecting the controller 201 turn on, such as by detecting the presence or existence of one or more boot variables used during the startup or booting of the controller 201, as mentioned above. Or for example, the controller 201 may detect a start of the engine 118 by detecting the controller 201 turn on and detecting that the engine speed of the engine 118 is zero, such as by employing the engine speed monitoring module 206, as described above. Or for example, the controller 201 may detect a start of the engine 118 by detecting the engine speed of the engine 118 increase from zero to a non-zero value, such as by employing the engine speed monitoring module 206, as described above. However, the controller 201 may detect a start of the engine 118 in any other appropriate way.

After detecting a start of the engine 118, the controller 201 may employ the engine speed monitoring module 206 to determine if a low speed condition of the engine was met before the controller 201 turned off. A low speed condition may be a function of one or more variables, and a low speed condition may be met in various ways. For example, a low speed condition of the engine 118 may be a function of only engine speed, and the low speed condition of the engine 118 may be met if the engine speed of the engine 118 decreases from a substantially non-zero value to substantially zero. Or for example, a low speed condition of the engine 118 may be a function of engine speed and engine speed deceleration rate, and the low speed condition of the engine 118 may be met if the engine speed decreases from a substantially non-zero value to substantially zero and/or if the engine speed decelerates at a deceleration rate that is greater than a threshold deceleration rate. In such an instance, if the engine speed of the engine 118 is substantially non-zero just before the controller 201 turns off, but the engine speed was decelerating at a deceleration rate greater than the threshold deceleration rate, the controller 201 may determine that the low speed condition of the engine 118 was met before the controller 201 turned off, and, therefore, that although the IMV 105 may stop receiving IMV commands 213 from the controller 201 and stop restricting flow to the fuel pump 104 as a result, it is unlikely that the flow from the fuel pump 104 will be fast enough or have enough time to increase the rail pressure of the fuel rail 106 to the high-pressure trigger point of the PRV 108. In at least some instances, a low speed condition of the engine 118 may be a function of any appropriate variables and be met in any appropriate way. For example, a low speed condition may be a function of engine speed, engine deceleration rate, and/or rail pressure. In some instances, a map of low speed conditions of the engine 118 is stored within the memory 202. For example, the threshold deceleration rate may be determined, via a map, look-up table, etc., based on engine speed and/or rail pressure, such that the threshold deceleration rate is greater for higher engine speeds and/or higher rail pressures.

If the controller 201 determines that a low speed condition of the engine 118 was met before the controller 201 turns off, the controller 201 may decrement the PRV opening events counter 204. In the example depicted in FIG. 4A, the controller 201 detects a start of the engine 118 at time $t_1$, when the engine speed of the engine increases from zero to a non-zero value. In response to detecting the start of the engine 118, the controller 201 increments the PRV opening events counter 204 from n to n+1. At time $t_2$, the controller 201 is turned off. In this example, the controller 201 determines that the engine speed of the engine 118 decreased from a non-zero value to zero before the controller 201 turned off, and decrements the PRV opening events counter 204 accordingly.

However, if the controller 201 determines that a low speed condition of the engine 118 was not met before the controller 201 turned off, the controller 201 may forgo decrementing the PRV opening events counter 204. In the example depicted in FIG. 4B, the controller 201 detects a start of the engine 118 at time $t_1$, when the controller 201 turns on. In response to detecting the start of the engine 118, the controller 201 increments the PRV opening events counter 204 from n to n+1. At time $t_2$, the controller 201 is turned off. In this example, the controller 201 determines that the engine speed of the engine 118 did not decrease from a non-zero value to zero before the controller turned off, and the controller 201 forgoes decrementing the PRV opening events counter 204. In other words, by incrementing the PRV opening events counter 204 when the controller 201 detects a start of the engine 118 and later decrementing or not decrementing the PRV opening events counter 204 based on the engine speed of the engine 118, the common rail fuel system 100 is able to preemptively account for openings of the PRV 108 that may otherwise be undetected.

As described above, the common rail fuel system 100, e.g., the controller 201, may determine if the PRV opening events counter 204 has exceeded a PRV opening events threshold, and, if so, generate and output a repair/replace PRV command 215 to an interface 220. It will be appreciated that the common rail fuel system 100 may determine if the PRV opening events counter 204 has exceeded a PRV opening events threshold in response to different triggers, or continuously. For example, in some instances, the controller 201 determines if the PRV opening events counter 204 has exceeded the PRV opening events threshold after detecting a start of the engine 118. Or for example, in some instances, the controller 201 determines if the PRV opening events counter 204 has exceeded the PRV opening events threshold after every instance in which the PRV opening events counter 204 is incremented.

Figure 5A:
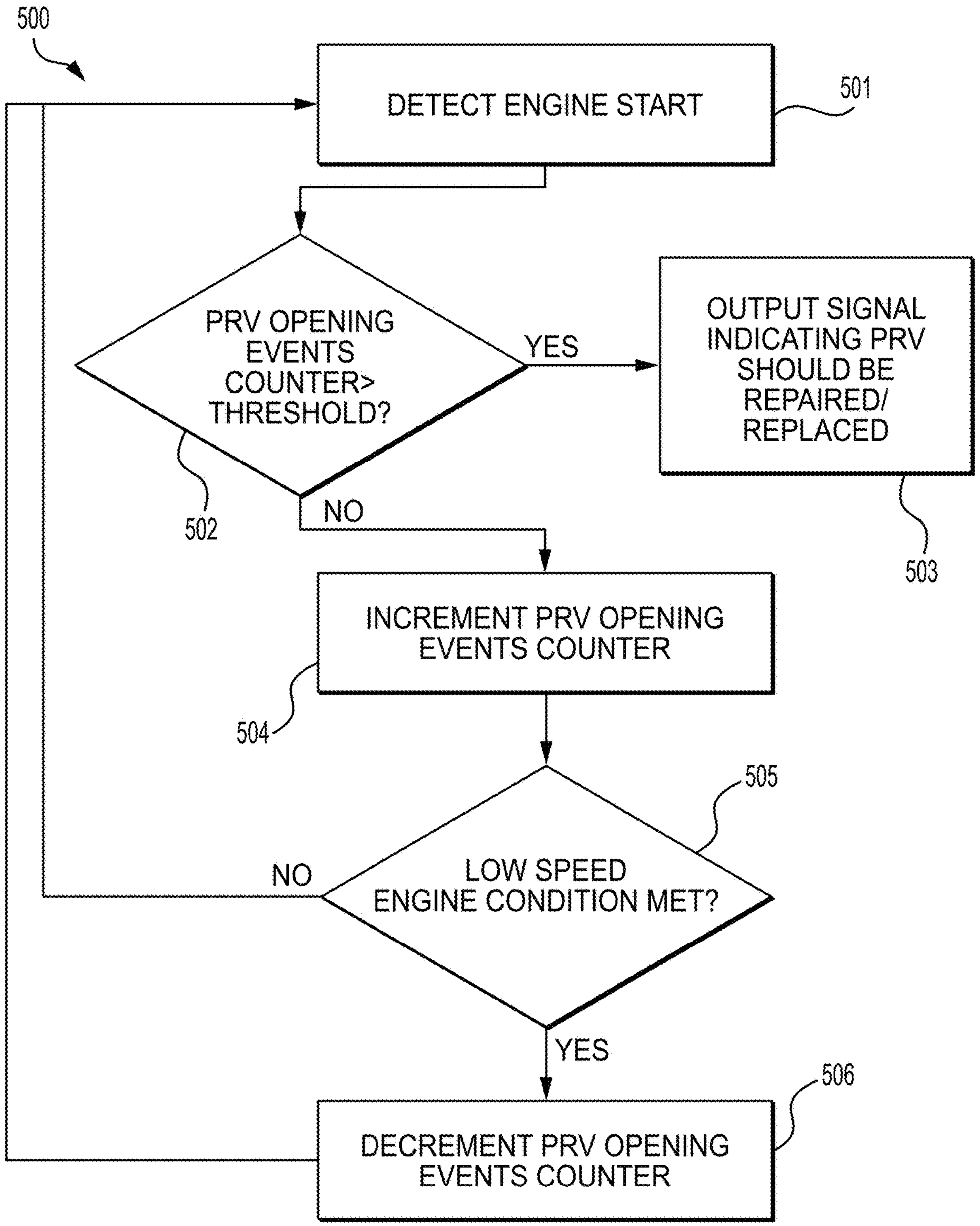
FIGS. 5A and 5B depict flowcharts of exemplary methods for controlling a common rail fuel system.
Figure 5B:
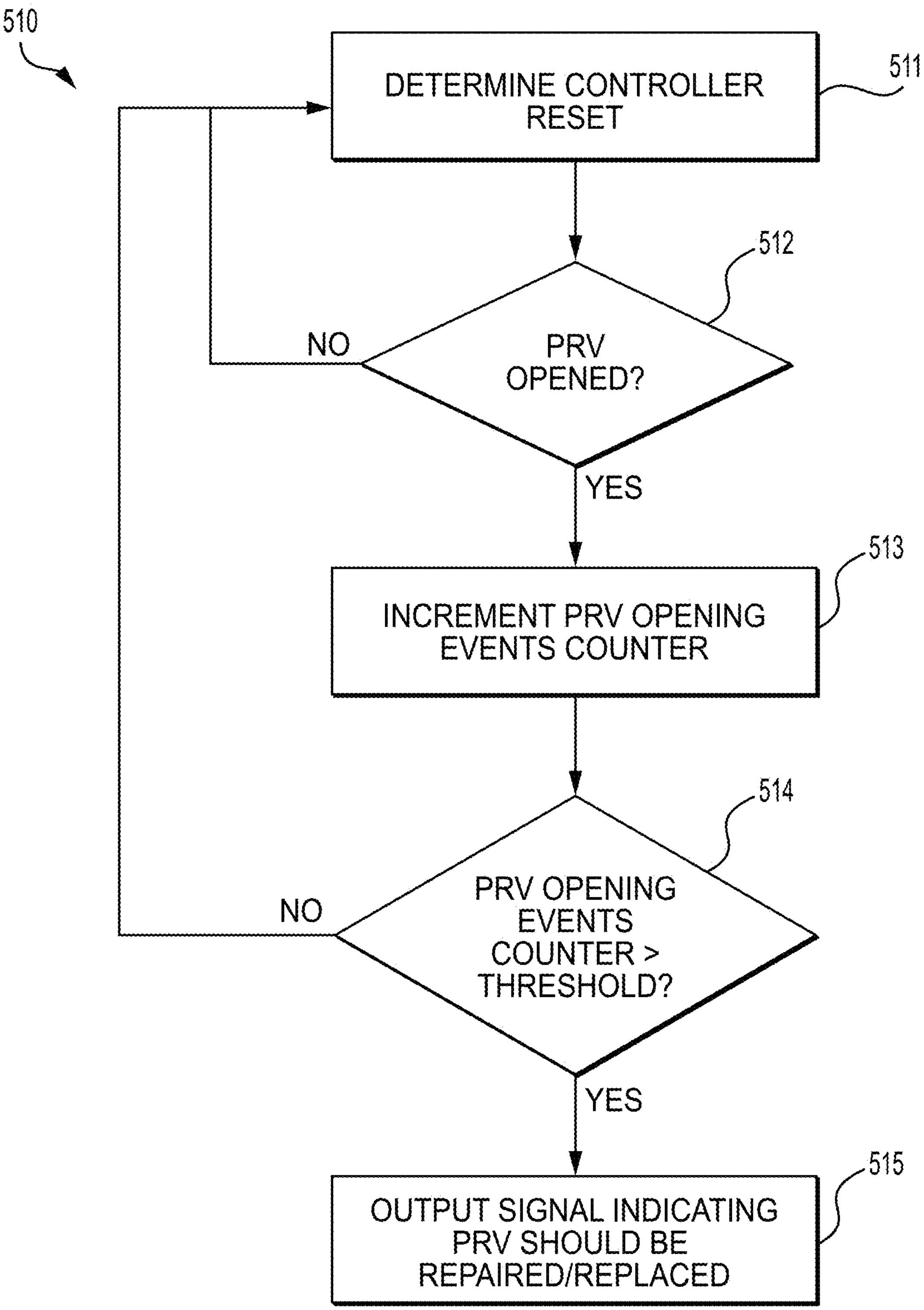

FIGS. 5A and 5B depict flowcharts of exemplary methods for controlling a common rail fuel system 100. It will be appreciated that the steps of the methods depicted in FIGS. 5A and 5B may be performed in any appropriate order, or simultaneously. It will be further appreciated that, for a single common rail fuel system 100, the methods depicted in FIGS. 5A and 5B may be performed in any appropriate order, or simultaneously.

Referring to FIG. 5A, a method 500 for controlling a common rail fuel system 100 may begin with a step 501, in which a controller 201 of the common rail fuel system 100 detects a start of an engine 118 operatively coupled to the common rail fuel system 100. As described above, the controller 201 may detect a start of the engine 118 in various ways, such as by detecting the controller 201 turn on or detecting an engine speed of the engine 118 increase from substantially zero to a substantially non-zero value.

As depicted in FIG. 5A, in some instances, after detecting the start of the engine 118 in step 501, the method 500 may continue with a step 502, in which the controller 201 determines if a PRV opening events counter 204 has exceeded a PRV opening events threshold, as described above. If the controller 201 determines that the PRV opening events counter 204 has exceeded the PRV opening events threshold, the method 500 may continue with a step 503, in which the controller 201 generates and outputs a repair/replace PRV command 215, as described above.

As depicted in FIG. 5A, in some instances, after detecting the start of the engine 118 in step 501, or if the controller 201 determines in step 502 that the PRV opening events counter 204 has not exceeded the PRV opening events threshold, the method 500 may continue with a step 504, in which the controller 201 increments the PRV opening events counter 204. After incrementing the PRV opening events counter 204 in step 504, the method 500 may continue with a step 505, in which the controller 201 determines if a low speed engine condition of the engine 118 was met before the controller 201 turns off, such as by employing the engine speed monitoring module 206, as described above.

If the controller 201 determines in step 505 that a low speed engine condition of the engine 118 was met before the controller 201 turns off, the method 500 may continue with a step 506, in which the controller 201 decrements the PRV opening events counter 204. If the controller 201 determines in step 505 that a low speed engine condition of the engine 118 was not met before the controller 201 turns off, the controller 201 may forgo decrementing the PRV opening events counter 204, represented in FIG. 5A as a return to step 501. If the controller 201 detects another start of the engine 118, the method 500 may begin anew, such that method 500 is performed for every engine startup.

Referring to FIG. 5B, a method 510 for controlling a common rail fuel system 100 may begin with a step 511, in which a controller 201 of the common rail fuel system 100 determines if the controller 201 reset, such as by detecting the presence or existence of one or more boot variables used in the startup or booting of the controller 201, as mentioned above.

As depicted in FIG. 5B, after determining that the controller 201 reset in step 511, the method 510 may continue with a step 512, in which the controller 201 determines if a PRV 108 of the common rail fuel system 100 opened, e.g., in response to the reset of the controller 201. As described above, the controller 201 may determine if the PRV 108 opened by determining if an engine speed of an engine 118 operatively coupled to the common rail fuel system 100 is substantially zero or substantially non-zero, such as by employing the engine speed monitoring module 206, and/or by determining if either or both of a first PRV opening event condition and a second PRV opening event condition are met, such as by employing a rail pressure monitoring module 205.

If the controller 201 determines in step 512 that the PRV 108 opened, the method 510 may continue with a step 513, in which the controller 201 increments a PRV opening events counter 204. Additionally or alternatively, if the controller 201 determines in step 512 that the PRV 108 opened, the controller 201 may generate and output a close PRV command 214 to the fuel pimp 104, such as by employing the pump control module 207, as described above. If the controller 201 determines in step 512 that the PRV 108 did not open, or is not likely to have opened, the controller 201 may forgo incrementing the PRV opening events counter 204.

As depicted in FIG. 5B, after incrementing the PRV opening events counter 204 in step 513, the method 510 may continue with a step 514, in which the controller 201 determines if the PRV opening events counter 204 has exceeded a PRV opening events threshold, as described above. If the controller 201 determines that the PRV opening events counter 204 has exceeded the PRV opening events threshold, the method 500 may continue with a step 515, in which the controller 201 generates and outputs a repair/replace PRV command 215, as described above. If the controller 201 determines that the PRV opening events counter 204 has not exceeded the PRV opening events threshold, the controller 201 may forgo generating and/or outputting the repair/replace PRV command 215. If the controller 201 detects another reset of the controller 201, the method 510 may begin anew.

The present disclosure provides systems and methods for accurately accounting for openings of a PRV 108 of a common rail fuel system 100 that may be difficult to detect, thereby avoiding use of the PRV 108 beyond the recommended usage of the PRV 108. Avoiding use of the PRV 108 beyond the recommended usage of the PRV 108 may avoid damage to the PRV 108, to the common rail fuel system 100, or to an engine 118 or engine system operatively coupled to the common rail fuel system 100. Accurately accounting for openings of the PRV 108 that may be difficult to detect may additionally or alternatively avoid extended operation of the PRV 108 in an open (e.g., latched) position. Avoiding extended operation of the PRV 108 in an open position may avoid damage to the PRV 108, to the common rail fuel system 100, or to an engine 118 or engine system operatively coupled to the common rail fuel system 100.

It will be apparent to those skilled in the art that various modifications and variations can be made to the disclosed systems and methods without departing from the scope of the disclosure. Other embodiments of the systems and methods will be apparent to those skilled in the art from consideration of the specification and practice of the systems and methods disclosed herein. It is intended that the specification and examples be considered as exemplary only, with a true scope of the disclosure being indicated by the following claims and their equivalents.

What is claimed is:

1. A common rail fuel system for an engine system including an engine, the common rail fuel system comprising:
- a fuel rail;
- a fuel pump fluidly coupled to the fuel rail;
- a pressure relief valve (PRV) fluidly coupled to the fuel rail;
- a rail pressure sensor;
- an engine speed sensor; and
- a controller, communicatively coupled to the rail pressure sensor and to the engine speed sensor, configured to:
- detect a start of the engine;
- in response to detecting the start of the engine, increment a PRV opening events counter;
- determine if a low speed condition of the engine was met before the controller turned off based at least in part on sensor data received from the rail pressure sensor or sensor data received from the engine speed sensor;
- in response to determining that the low speed condition of the engine was met before the controller turned off, decrement the PRV opening events counter;
- determine if the PRV opening events counter has exceeded a PRV opening events threshold; and
- in response to determining that the PRV opening events counter has exceeded the PRV opening events threshold, output a signal indicating that the PRV should be repaired or replaced.

2. The common rail fuel system of claim 1, wherein the controller is further configured to detect the start of the engine by determining that the controller turned on.

3. The common rail fuel system of claim 1, wherein the controller is further configured to detect the start of the engine by determining that the controller turned on and detecting that the engine speed of the engine is equal to substantially zero.

4. The common rail fuel system of claim 1, wherein the controller is further configured to detect the start of the engine by detecting the engine speed of the engine increase from substantially zero to a substantially non-zero value.

5. The common rail fuel system of claim 1, wherein the controller is further configured to store the PRV opening events counter on the memory while the controller is turned off.

6. The common rail fuel system of claim 1, wherein the controller is further configured to determine if the PRV opening events counter has exceeded the PRV opening events threshold in response to detecting the start of the engine.

7. The common rail fuel system of claim 1, wherein the controller is further configured to determine if the PRV opening events counter has exceeded the PRV opening events threshold after incrementing the PRV opening events counter in response to detecting the start of the engine.

8. A controller for a common rail fuel system operatively coupled to an engine system including an engine, the common rail fuel system including a fuel pump, a fuel rail, and a pressure relief valve (PRV), the controller including at least one processor and at least one memory storing instructions which, when executed by the at least one processor, cause the at least one processor to perform operations comprising:

determining if the controller reset;

determining if the PRV opened;

in response to determining that the PRV opened, incrementing a PRV opening events counter;

determining if the PRV opening events counter has exceeded a PRV opening events threshold; and in response to determining that the PRV opening events counter has exceeded the PRV opening events threshold, outputting a signal indicating that the PRV should be repaired or replaced.

9. The controller of claim 8, wherein the operations further comprise:

determining if an engine speed of the engine is greater than substantially zero;

in response to determining that the engine speed is greater than substantially zero, determining if a rail pressure of the fuel rail is within a pressure regulated range;

in response to determining that the rail pressure is within the pressure regulated range, outputting an increase pressure command; and after outputting the increase rail pressure command, determining if the rail pressure remains within the pressure regulated range.

10. The controller of claim 9, wherein the instructions are further configured to cause the at least one processor to increment the PRV opening events counter in response to determining that the rail pressure remained within the pressure regulated range after outputting the increase rail pressure command.

11. The controller of claim 8, wherein the operations further comprise outputting a close PRV command in response to determining that the PRV opened.

12. The controller of claim 11, wherein outputting the close PRV command causes flow from the fuel pump to be reduced or terminated.

13. The controller of claim 8, wherein the processor is further operative to forgo incrementing the PRV opening events counter in response to determining that the PRV has not opened.

14. The controller of claim 8, wherein the common rail fuel system further includes a normally-open metering valve, wherein the processor is further operative to output one or more commands that cause the metering valve to restrict flow from the fuel pump to the fuel rail, and wherein the metering valve does not receive the one or more commands during the reset of the controller.

15. A common rail fuel system operatively coupled to an engine system including an engine, the common rail fuel system comprising:

a fuel rail;

a fuel pump fluidly coupled to the fuel rail;

a pressure relief valve (PRV) fluidly coupled to the fuel rail;

a rail pressure sensor;

an engine speed sensor; and a controller, communicatively coupled to the rail pressure sensor and to the engine speed sensor, configured to:

increment a PRV opening events counter based on sensor data received from the rail pressure sensor or sensor data received from the engine speed sensor;

determine if the PRV opening events counter has exceeded a PRV opening events threshold; and in response to determining that the PRV opening events counter has exceeded the PRV opening events threshold, output a signal indicating that the PRV should be repaired or replaced.

16. The common rail fuel system of claim 15, wherein the controller is further configured to increment the PRV opening events counter in response to detecting an engine speed of the engine increase from substantially zero to a substantially non-zero value based on the sensor data received from the engine speed sensor.

17. The common rail fuel system of claim 16, wherein the controller is further configured to:

after detecting the engine speed increase from substantially zero to a substantially non-zero value, determine if a low speed condition of the engine was met before the controller turned off; and in response to determining that the low speed condition of the engine was met before the controller turned off based on the sensor data received from the engine speed sensor, decrement the PRV opening events counter.

18. The common rail fuel system of claim 15, wherein the controller is further configured to:

determine that the controller reset;

in response to detecting the reset of the controller, determine if the PRV opened; and increment the PRV opening events counter in response to determining that the PRV opened.

19. The common rail fuel system of claim 18, wherein the controller is further configured to determine if the PRV opened by:

determining if an engine speed of the engine is greater than substantially zero;

determining if a rail pressure of the fuel rail is within a pressure regulated range;

outputting an increase pressure command; and after outputting the increase pressure command, determining if the rail pressure remains within the pressure regulated range.

20. The common rail fuel system of claim 18, wherein the controller is further configured to output a close PRV command in response to determining that the PRV opened.

* * * * *